United States Patent [19]

Selin et al.

[11] Patent Number: 4,530,999

[45] Date of Patent: Jul. 23, 1985

[54] METHOD OF PRODUCING CELLULOSE CARBAMATE FIBERS OR FILMS

[75] Inventors: Johan-Fredrik Selin, Helsinki; Jouko Huttunen, Porvoo; Olli Turunen, Porvoo; Jan Fors, Porvoo; Vidar Eklund, Porvoo; Kurt Ekman, Porvoo, all of Finland

[73] Assignee: Neste OY, Finland

[21] Appl. No.: 667,430

[22] Filed: Nov. 1, 1984

[30] Foreign Application Priority Data

Nov. 2, 1983 [FI] Finland .................................. 834029

[51] Int. Cl.$^3$ ............................................ C08B 15/06
[52] U.S. Cl. ........................................................ 536/30
[58] Field of Search .......................................... 536/30

[56] References Cited

U.S. PATENT DOCUMENTS

| | | | |
|---|---|---|---|
| 3,352,773 | 11/1967 | Schwartz et al. | 536/30 |
| 4,404,369 | 9/1983 | Huttunen et al. | 536/30 |
| 4,456,749 | 6/1984 | Mandell et al. | 536/30 |
| 4,486,585 | 12/1984 | Turunen et al. | 536/30 |

Primary Examiner—Ronald W. Griffin
Attorney, Agent, or Firm—Steinberg & Raskin

[57] ABSTRACT

The production of cellulose carbamate fibers or films by reacting cellulose with urea to form cellulose carbamate which is dissolved in alkaline solution to form a spinning solution which is spun through an acid precipitation bath is improved by subjecting the cellulose carbamate prior to dissolution in alkaline solution to irradiation of about 0.05–10 Mrad. After dissolution in alkaline solution the same may be subjected to further mild irradiation.

10 Claims, No Drawings

METHOD OF PRODUCING CELLULOSE CARBAMATE FIBERS OR FILMS

BACKGROUND OF THE INVENTION

The present invention is directed to a method for producing cellulose carbamate fibers or films. More specifically, the present invention is directed to a method of producing cellulose carbamate fibers or films, in which the cellulose carbamate is irradiated.

Finnish Pat. No. 61,033 and U.S. Pat. No. 4,404,369 disclose a process for the manufacture of an alkali-soluble cellulose derivative from cellulose and urea. This process is based on the fact that when urea is heated to its melting point or to a higher temperature, it begins to decompose, forming isocyanic acid and ammonia. Isocyanic acid reacts with cellulose, producing an alkali-soluble cellulose derivative which is called cellulose carbamate. The reaction may be written as follows:

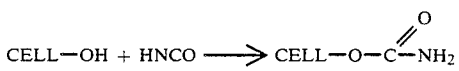

The thus-produced compound, cellulose carbamate, may be dried after washing and stored even over prolonged periods, or it may be directly dissolved in an aqueous alkaline solution, e.g. for fiber production. Cellulose carbamate fibers or films may be produced from this aqueous alkaline solution by spinning or by extrusion, in a similar manner as in the viscose manufacturing process. The good stability and transportability of cellulose carbamate afford a major advantage over the cellulose xanthate of the viscose process, since the cellulose xanthate cannot be stored nor transported, not even in solution form.

When it is desired to produced continuous fiber or filament of cellulose carbamate suitable for use in textiles, the carbamate is first dissolved in an alkaline solution, e.g. an aqueous solution of sodium hydroxide. The cellulose carbamate may be spun from this solution thorugh spinnerets, into an acid preparation bath which causes precipitation of the cellulose carbamate. Precipitation may also be accomplished in solutions of lower alcohols, such as for instance solutions of methanol, ethanol, or butanol, or in hot aqueous salt solutions.

Spinnability of the alkaline solution of cellulose carbamate is influenced, by among other factors, by the carbamate content, viscosity and clogging number of the solution. The clogging number is associated with the amount of gel-like, incompletely dissolved fiber particles present in the solution. It has been found that the clogging number is essentially dependent upon the degree of polymerization (DP) of the cellulose used as the starting material in the production of the celluslose carbamate. The degree of polymerization (DP) of the cellulose also affects the viscosity of the alkaline solution of the end product, i.e. the cellulose carbamate, and affects the amount of carbamate taken up by the alkaline solution. Uniformity of the degree of polymerization (DP) of the starting cellulose material, is highly significant regarding the clogging number.

An appropriate degree of polymerization (DP) of the cellulose has proven to be 800-400. An alkali treatment has been traditionally used for reducing the degree of polymerization (DP). In the method disclosed in U.S. patent application Ser. No. 537,379, filed Aug. 30, 1983, now U.S. Pat. No. 4,486,585, issued Dec. 4, 1984, the alkali treatment has been replaced by irradiation of the starting cellulose material. In other words, the starting cellulose material is subjected to a radiation dose of 0.5-10 Mrad, by the influence of which the degree of polymerization (DP) of the cellulose is lowered to an appropriate level. When an efficient radiation source is utilized, depolymerization of the starting cellulose material takes place rapidly, and is easily controllable by changing the intensity or time of irradiation.

When fibers are produced from cellulose carbamate for various purposes, it is necessary to select an appropriate carbamate quality for each particular case. This means that it would be desirable to select a carbamate with a suitable level of the degree of polymerization (DP) for each particular purpose, with a view both to spinning and to the ultimate quality of the fiber constituting the ultimate product. However, this consequently means that a great number of different kinds or brands of cellulose carbamate would have to be manufactured and stored, a practice which would be economically unsound and also inconvenient from the viewpoint of production of the cellulose carbamate fibers or films.

SUMMARY OF THE INVENTION

It has now been found that with the present invention, it is possible to proceed in a different, opposite manner from the processes noted above in preparing cellulose carbamate of appropriate quality for each particular use, whereby remarkable advantages are attained. It has been found that if cellulose carbamate that has been synthesized through the reaction between cellulose and urea, is sufficiently irradiated, then the degree of polymerization (DP) of the cellulose used in the starting material in producing the cellulose carbamate, need not be lowered or even regulated at all, or in any event, the requirement of lowering such degree of polymerization is remarkably less than previously.

Accordingly, it is an object of the present invention to improve production of cellulose carbamate fiber or film.

It is also an object of the present invention to simplify manufacture of cellulose carbamate fiber or film.

It is an additional object of the present invention to provide for the production of cellulose carbamate fiber or film in a more economical manner.

It is another object of the present invention to improve the spinnability of cellulose carbamate used to prepare fiber or film.

It is a further object of the present invention to avoid unnecessary pre-treatment of cellulose precursor in the manufacture of cellulose carbamate fiber or film.

It is also another object of the present invention to avoid having to greatly regulate or regulate at all, degree of polymerization (DP) of the starting cellulose in the manufacture of cellulose carbamate fiber or film.

It is still another object of the present invention to avoid unnecessary pre-treatment of starting cellulose with alkali in the manufacture of cellulose carbamate fiber or film.

It is yet another object of the present invention to avoid having to irradiate starting cellulose material in the manufacture of cellulose carbamate fiber or film.

It is even a further object of the present invention to lower the degree of polymerization (DP) and/or clogging number of cellulose carbamate used to prepare fiber or film.

It is even another object of the present invention to provide for preparation of various kinds of cellulose carbamate fiber or film, each kind being particularly suitable for a distinct use thereof.

With the above objects in view, the present invention mainly comprises irradiating the cellulose carbamate prior to being dissolved in an alkaline solution. The cellulose carbamate is subjected to a radiation dose of about 0.05 to 10 Mrad.

The present invention is directed to a procedure for manufacturing cellulose carbamate fiber or film in which cellulose and urea are reacted with one another at an elevated temperature, following which the cellulose carbamate is dissolved in an alkaline solution for spinning. This prepared spinning solution is then spun into an acid precipitation solution, e.g. through spinnerets, for precipitating the fiber or film of cellulose carbamate. In the procedure of the present invention, the cellulose carbamate, prior to being dissolved in the alkaline solution, is subjected to an irradiation dose of about 0.05 to 10 Mrad. If necessary, the cellulose carbamate is again treated with mild irradiation after having been dissolved in the alkaline solution, for a total irradiation dose of about 0.05–10 Mrad.

One advantage of the process of the present invention is that the expensive alkali treatment of the starting cellulose material for regulating the degree of polymerization (DP) thereof, may be omitted. The step of irradiating the starting cellulose material for regulating the degree of polymerization (DP) thereof, may also be eliminated, if it is desired to manufacture only a few basic kinds or brands of the cellulose carbamate fiber or films according to the procedure of the present invention, and the cellulose carbamate required for each particular end product is treated by irradiation at the required intensity for each particular end use. Thus another advantage of the present invention is that the manufacture of the ultimate end product of cellulose carbamate fiber or film, may control the regulation of the quality or properties of the requisite cellulose carbamate utilized for preparation of the end product, instead of just the manufacture of the cellulose carbamate raw material being able to regulate the characteristics or properties of the cellulose carbamate so produced. This imparts additional flexibility in the overall production of desired cellulose carbamate fiber or film, a significant improvement over the previously-used procedures for preparing the same.

DETAILED DESCRIPTION OF THE PREFERRED EMBODIMENTS

In the present invention, irradiation is best accomplished by conducting the cellulose carbamate in non-dissolved form, e.g. in the form of loose fibers or a web, past a radiation source. The prepared cellulose carbamate may be in the form of loose fibers, a fiber mat, a web, or sheets. The requisite irradiation of the cellulose carbamate may be supplied either entirely prior to dissolving in the alkaline solution, or with even a portion of the requisite irradiation carried out on the cellulose starting material alone, prior to manufacturing of the cellulose carbamate, as taught in U.S. patent application Ser. No. 537,379.

Also, it is feasible to subject the cellulose carbamate to mild irradiation after it has been dissolved in the alkaline solution. Even minimal irradiation doses (e.g. about 0.05–0.5 Mrad) after dissolution in the alkaline solution, are sufficient to afford the opportunity of adjusting the properties of the resulting spinning solution, even at this stage. However, irradiation prior to dissolution in the alkaline solution is still essential, since more concentrated cellulose carbamate solutions are thereby achievable. The required total irradiation dose is in the range of about 0.05–10 Mrad, and is selected in accordance with the desired properties of the cellulose carbamate fiber or film that is produced as the ultimate end product.

Ionizing radiation can be utilized in the method of the present invention, including electron radiation and gamma radiation. Conventionally available means of the prior art may be utilized to preduce these requisite types of irradiation. Typical gamma emitters generally comprise a radiation shield, transporting arrangements for the material to be irradiated, and also a source of irradiation, usually comprising cobalt-60. A tungsten filament cathode is conventionally employed for producing electron irradiation, to generate electrons which are accelerated in a vacuum with the aid of an electric field to the desired energy level, usually in the range of about 0.1–4 MeV.

Production of cellulose carbamate from cellulose and urea at elevated temperature, may take place, for example, by a procedure according to Finnish Pat. Nos. 61,033 or 62,318. In the procedure of Finnish Pat. No. 62,318, the urea is dissolved in liquid ammonia, and the cellulose fibers are treated at a temperature lower or higher than the boiling point of the ammonia. In this latter instance, the treatment is accomplished in a pressure vessel.

The quantity of urea within the ammonia solution may be selected within rather wide limits, depending upon other processing variables. Normally, the adequate quantity of urea is between about 15–120% by weight, calculated with respect to the weight of the cellulose. The quantity of urea selected in each case depends, among other factors, on the reaction temperature and reaction time used. The required steeping time varies from about 5 seconds to several hours.

After the cellulose has been treated for the desired time with a solution of urea in ammonia, the ammonia is removed from the cellulose in any convenient manner. The urea will then remain as a residue, homogenously distributed through the cellulose. The ammonia is preferably recovered and reused. Vacuum treatment and/or heating may be used, for example, for evaporation of the ammonia.

The actual reaction between the cellulose and urea is accomplished at elevated temperature after removing the ammonia. The requisite reaction time depends, among other factors, on the quantity of urea, on the steeping conditions, and on the heating conditions. In general, a temperature between about 110° C. and 200° C. is required. The requisite reaction time varies, as a rule, from a few minutes to a few hours. The heating and reaction of the cellulose and urea, are favorable effected at subatmospheric pressure or in a vacuum, whereby the ammonia that is formed is rapidly voided from within the reaction volume.

On completion of the reaction between the cellulose and the urea, the end product is washed once or several times, after which irradiation of the formed cellulose carbamate is carried out in the manner of the present invention.

Dissolving of the cellulose carbamate in the alkaline solution, subsequent to the irradiation step, preferably takes place by the carbamate being suspended in water, and the alkaline solution required for dissolution being added thereafter. Dissolution is preferably accomplished at a low temperature, about −5° C., with continuous mixing and cooling if required. Dissolution may be improved by adding urea either to the water or to the alkaline portion of the solution prior to addition. In general, dissolution is accomplished within one to three hours. If a higher dissolving temperature is used, the dissolution rate drops appreciably.

Any alkali or organic base may be utilized in the alkaline solution. Sodium hydroxide and potassium hydroxide are suitable alkalis, while tetramethylammonium hydroxide and ethylene diamine are suitable organic bases. The amount of alkali or base required depends on the type of alkaline solution required in each instance. When using sodium hydroxide, a concentration of the alkaline solution is preferably less than 2%, because larger sodium hydroxide quantities may adversely affect the properties of the resulting fiber. The suitable sodium hydroxide quantity, is therefore in the range of about 0.1 to 2%. Potassium hydroxide is not as powerful as sodium hydroxide, so that a suitable quantity is in the range of about 0.1 to 4%. Organic bases are not as strong as the alkalis, and therefore the appropriate concentration range may vary in the range of 0.1 to 10% of the alkaline solution.

The present invention is described in more detail, with reference to the following examples:

One of the most important characteristics of a cellulose derivative solution intended for producing fibers, is the filterability thereof. Filterability is described in the examples by the so-called clogging number defined in the article: H. Sihtola, Paperi Ja Puu 44 (1962) No. 5, pages 295–300. In the method, a miniature filter is used, having 3.8 cm$^2$ affective area, the filter material being Macherey-Nagel MN616 paper. The filterability is calculated by the formula:

$$KW_{20,60} = \tfrac{1}{2} \times 10^4 \, (60/P_{60} - 20/P_{20}),$$

where
$P_{20}$ = cellulose quantity (in g) drained through the filter in 20 minutes
$P_{60}$ = cellulose quantity (in g) drained through the filter in 60 minutes, and
$KW_{20,60}$ = clogging number.

EXAMPLE 1

Chemically purified cotton (DP 1300) was impregnated in sheet form with liquid ammonia in which urea had been dissolved. The ammonia was allowed to evaporate, whereby the sheet contained urea in a concentration of 60% of the weight of the cellulose. The sheet was then treated between hot plates at 20° C. for 3 minutes.

The cellulose carbamate produced after the reaction was washed three times with water and once with methanol. The carbamate had a DP of 950 and a nitrogen content of 2.48%. A 2.1% solution of this product was prepared in 10% sodium hydroxide at −5° C. The clogging number of the solution was found by measurement to be approximately 100,000.

A portion of the cellulose carbamate was conducted past a gamma filter in such a manner that this sample was subjected to a total irradiation dose of 0.75% Mrad. The cellulose carbamate had a DP of 480 and a nitrogen content of 2.3%. The cellulose carbamate was then dissolved in the 10% sodium hydroxide solution at −5° C. The carbamate content of the solution was 4.5%, and the clogging number $KW_{20,60}$ was found to be 860.

EXAMPLE 2

Bleached sulphite cellulose having a DP of 800 was impregnated with urea in the same manner as in Example 1. The urea content in the sheet was 50% of the cellulose weight. The sheet was treated between hot plates at 220° C. for two minutes. Subsequent to washing, the cellulose carbamate had a DP of 650 and a nitrogen content of 2.15%. A 3% carbamate solution was prepared in 10% sodium hydroxide solution −5% C. The clogging number of the solution was found to be about 5000.

A portion of the cellulose carbamate was subject to irradiation from an electron emitter in such a manner that the sample was given a 0.5 Mrad dose. Subsequent to irradiation, the DP of the cellulose carbamate was 390, and the nitrogen content was 2.20%. A 5.3% of cellulose carbamate solution was prepared in 20% sodium hydroxide at −5° C. The clogging number of this solution was measured to be 570.

EXAMPLE 3

Cellulose carbamate was produced from sulphite cellulose as in Example 2, with the urea quantity being 25% of the cellulose weight prior to heat treatment. The results are presented in the following table.

TABLE

|  | No irradiation | Iradition: 0,5 Mrad |
| --- | --- | --- |
| DP | 670 | 490 |
| Nitrogen Content | 1.7 | 1.7 |
| clogging number ($K_q$) | — | 480 |

EXAMPLE 4

Cellulose carbamate was produced from bleached sulphite cellulose (DP 800), using urea in a concentration of 38% of the cellulose weight. The reaction temperature was 220° C. and the reaction time was 2 minutes, 35 seconds. The cellulose carbamate had a DP of 690 and a nitrogen content of 2.1%. The clogging number of a 3.2% solution prepared in 10% sodium hydroxide solution, was found to be 18,000, and the ball viscosity, 17 seconds.

After the cellulose carbamate has been subjected to a 0.5 Mrad radiation dose from an electron emitter, its DP was found to be 410. A 5.4% solution was prepared of this irradiated cellulose carbamate in a 10% sodium hydroxide solution. The clogging number of the solution was now found to be 305 and the ball viscosity found to be 17 seconds.

What is claimed is:

1. In a method for producing cellulose carbamate fiber or film, comprising the steps of
   reacting cellulose and urea at elevated temperature to form cellulose carbamate,
   dissolving the thus-formed cellulose carbamate in an alkaline solution to prepare a spinning solution from which cellulose carbamate can be spun, and
   spinning the thus-prepared solution through an acid precipitation solution to form fiber or film,
   the improvement comprising the step of
   irradiating the thus-formed cellulose carbamate with from about 0.05 to about 10 Mrad of radiation dose prior to dissolving the same in the alkaline solution, whereby the dissolvability of the cellulose carbamate is increased.

2. In the method of claim 1, the improvement comprising the additional step of
irradiating the cellulose carbamate after dissolution in the alkaline solution, whereby the total irradiation dose of the cellulose carbamate being from about 0.05 to about 10 Mrad.

3. The method of claim 1, wherein the cellulose carbamate is irradiated in the form of loose fibers or a web.

4. The method of claim 2 wherein the cellulose carbamate is irradiated in the form of loose fibers or a web.

5. A method for producing cellulose carbamate fiber or film, comprising the steps of
reacting cellulose with urea to form cellulose carbamate,
irradiating the thus-formed cellulose carbamate with from about 0.05 to about 10 Mrad of radiation dose, whereby the dissolvability of the cellulose carbamate is increased,
dissolving the thus-irradiated cellulose carbamate in an alkaline solution to form a spinning solution, from which cellulose carbamate can be spun, and
spinning the thus formed spinning solution through an acid precipitation solution to form fiber or film.

6. The method of claim 5, comprising the additional step of
irradiating the cellulose carbamate after dissolution in the alkaline solution, the total irradiation of the cellulose carbamate being from about 0.05 to about 10 Mrad.

7. The method of claim 5 wherein the cellulose carbamate is irradiated in the form of loose fibers or a web.

8. The method of claim 6, wherein the cellulose carbamate is in the form of loose fiber or a web when irradiated.

9. The method of claim 5, wherein the cellulose remains untreated with alkali prior to, and during reaction with the urea.

10. The method of claim 5, wherein the cellulose is not irradiated prior to reaction with the urea.

* * * * *